P. HARRIS

Jan. 19, 1932. ARTIFICIAL EYELASHES FOR DOLLS Re. 18,337

Original Filed April 3, 1928 2 Sheets-Sheet 1

INVENTOR
Percival Harris
BY
ATTORNEYS

P. HARRIS

Jan. 19, 1932. ARTIFICIAL EYELASHES FOR DOLLS Re. 18,337

Original Filed April 3, 1928 2 Sheets-Sheet 2

INVENTOR
Percival Harris
BY
ATTORNEYS

Reissued Jan. 19, 1932

Re. 18,337

UNITED STATES PATENT OFFICE

PERCIVAL HARRIS, OF WOODSIDE, NEW YORK

ARTIFICIAL EYELASHES FOR DOLLS (Original No. 1,741,415, dated December 31, 1929, Serial No. 266,974, filed April 3, 1928. Application for reissue filed October 30, 1931. Serial No. 572,148.

This invention relates to the making of artificial eye lashes for dolls, and relates further to the making of dolls' heads embodying artificial eye lashes.

In the manufacture of artificial eye lashes for dolls made from human or animal hair, it is the practice to attach a layer of hair strands onto a strip of tape made, for example, of paper, the hair forming an eye lash fringe and the tape forming a base or foundation therefor. In manufacturing these eye lash members in quantity, the hair is laid over and is adhesively applied to a plurality of parallelly spaced strips of tape surfaced with an adhesive such as glue, and after the adhesive is dry the formation produced is cut along transverse and longitudinal lines to produce the individual eye lash members. In a variation of this process the hair is secured between two strips of tape, the second strip being applied after the layer of hair is laid over a first strip.

Eye lash members made in accordance with this prior method possess certain objections which it is the prime object of my present invention to rectify and obviate. In carrying out the prior process, it is difficult to lay the hair strands uniformly over the strips of tape with the consequence that the fringe of strands defining the resulting eye lash presents in many instances a non-uniform appearance. The strips of tape employed, while flexible in many directions, are comparatively inflexible against torsional stresses or forces in the plane of the tape; and this makes it difficult to cause the hair strands to spread out in radiating or fan-like formation in the simulation of the human eye lash when the eye lash member is applied or affixed to a doll's eye or a doll's head. Sometimes difficulty is also experienced in gluing all of the hair strands to the tape foundation, with the result that some of the hair strands loosen and become detached, producing a greater lack of uniformity in the arrangement of the hair strands of the resulting eye lash member.

One principal object of my present invention centers about the provision of an improved eye lash member for dolls' eyes or dolls' heads produced by an improved process which is characterized by the absence of the aforesaid objections incident to and resulting from prior methods of manufacture.

Another primary object and feature of the present invention resides in the provision of a doll's head having painted or stationary eyes and having eye lashes projecting directly out of the head adjacent the eyes in a realistic manner.

A further prime object of my present invention is directed to the making of dolls' heads of the shell or mask type embodying eye lash members affixed or applied thereto in such a manner that a most natural and life-like simulation of the human eye lash is obtained without affecting the structural integrity of the shell or mask head. A corollary object of the invention relates to an effective combination of such dolls' heads with the improved eye lash members of my present invention.

To the accomplishment of the foregoing and such other objects as will hereinafter appear, my invention consists in the elements and their relation one to the other, as hereinafter more particularly described and sought to be defined in the claims, reference being had to the accompanying drawings which show the preferred embodiment of my invention, and in which Fig. 1 is a perspective view of a doll's head of the shell or mask type showing my invention applied thereto;

Among the more important desiderata in the making of artificial eye lash members for dolls are the production of a uniform distribution in the hair strands of the eye lash fringe, the provision of a base or foundation therefor which is flexible in all directions and particularly in the plane of the base to permit the hair strands to be spread out in fan-like formation and to be manipulated to suit the various needs of service, and the provision of an eye lash member structure which is capable of being made in quantity production by machine methods and which is capable of being handled and manipulated with convenience and ease when applied or affixed to dolls' heads or dolls' eyes of the variety of kinds met with in practice. These desiderata I accomplish by the making of the eye lash members in the form best shown in Fig. 6 of the drawings and by the method shown sequentially in Figs. 4 to 6 of the drawings.

Figure 6:
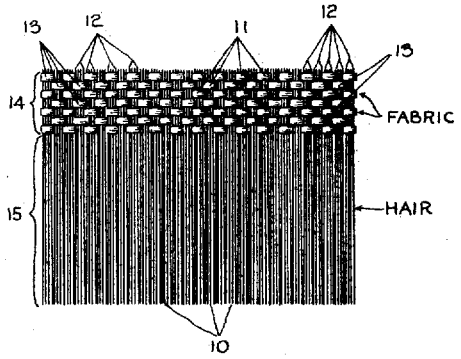
Fig. 6 is a detail view shown on an enlarged or magnified scale of the eye lash member of the present invention.

Referring now more in detail to the drawings and having reference first to Fig. 6 thereof, the eye lash member of my present invention comprises a fringe layer of strands collectively designated as 10 made of human or animal hair forming a uniform or even spread of fibres and a supporting base or foundation 11 therefor, said supporting base or foundation comprising a network of fabric strands interwoven with the strands 10 of the hair layer at one end or edge of said layer. This eye lash member is made by a weaving process, the hair strands 10 forming the weft threads and the fabric strands 11 forming the warp threads of the weave. The weaving step is practiced so that the layer of hair strands 10 is subdivided into tufts 12, 12, each tuft being held by a binding loop of the warp fabric strands, as clearly shown in Fig. 6 of the drawings, the binding loops being designated as 13, 13. In practice, the width 14 of the band of fabric strands 11 is made about ¼ or ⅕ of the width 15 of the layer of hair strands 10 and thus may be made comparatively narrow (the width of the same being exaggerated in Fig. 6 of the drawings for purposes of illustration) so that the base or foundation may be made to occupy small dimensions.

Figure 1:
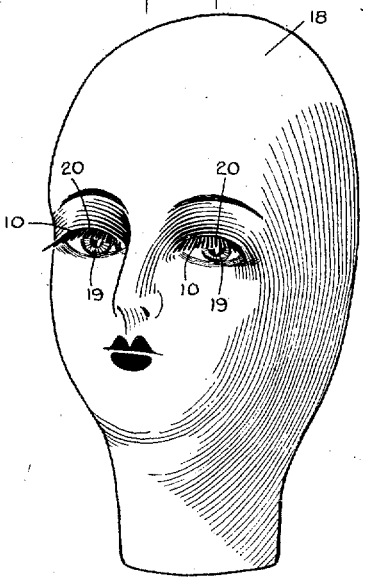
Figure 2:
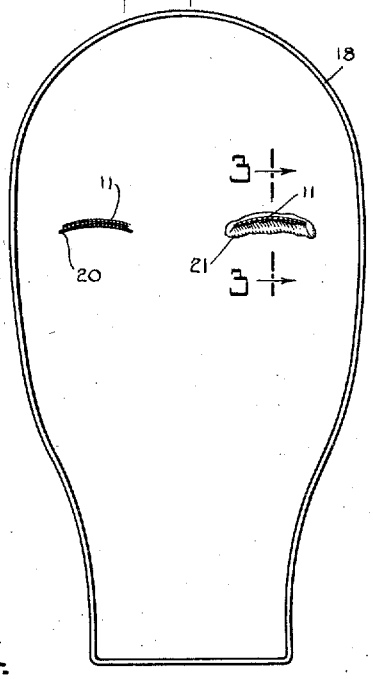
Fig. 2 is a rear elevational view thereof and showing steps in the process of applying the eye lashes to the mask head.
Figure 3:
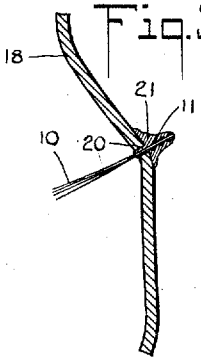
Fig. 3 is an enlarged view thereof taken in cross section in the plane of the line 3—3, Fig. 2.
Figure 4:
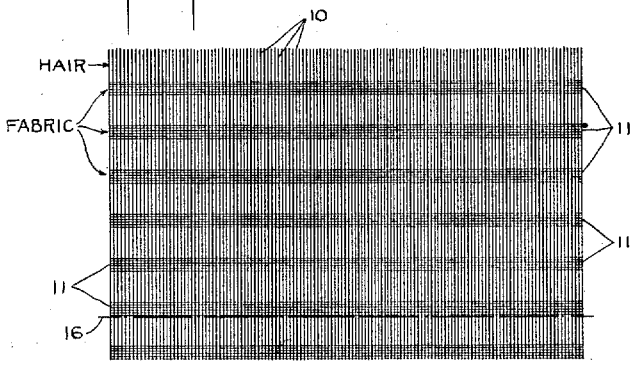
Figs. 4 and 5 are generalized views showing steps in the making of the eye lash members in accordance with my present invention.
Figure 5:
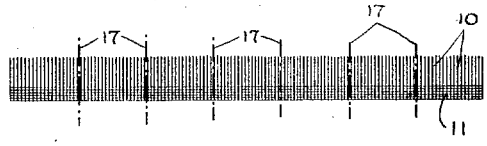

The advantages in the manufacture and use of eye lash members embodying this structure are typically illustrated by the process disclosure of Figs. 4 and 5 of the drawings, and by the disclosure of the invention shown in Figs. 1 to 3 of the drawings. As shown in Figs. 4 and 5 of the drawings, the eye lash members are made by interweaving the warp fibre strands 11, 11 with an extensive layer of uniformly distributed hair strands 10 forming the woof of the woven product, the warp fabric threads 11 being spaced in parallel bands to produce the formation shown in Fig. 4 of the drawings, after which the woven formation thus produced is severed first along transverse lines such as 16 to produce single row formations such as shown in Fig. 5 of the drawings, each of which is then severed along the longitudinal lines 17, 17 to produce the individual members shown in Fig. 6 of the drawings. This weaving process permits the obtaining of a uniform product in quantity production by the application of machine methods and thus enables the manual or hand methods heretofore practiced to be dispensed with. Moreover, the use of glue or adhesive incident to prior methods is eliminated and therefore the individual eye lash members may be fingered or handled when the same are to be applied to the dolls' eyes or heads in a clean manner and without that disadvantage of "sticking" or adhering to the fingers met with in the practice of prior methods. The band or network 14 of the fabric strands 11 presents a foundation which is universally flexible while still capable of supporting the hair strands as a rigid eye lash unit, the fabric network being particularly flexible and yieldable to torsional stresses in its own plane so that the band 14 of the hair strands 10 may be spread out in a flared or fan-like formation to produce a natural eye lash simulation, as shown for example in Figs. 1 to 3 of the drawings.

In Figs. 1 to 3 of the drawings, I show the eye lash member applied to a doll's head 18 of the shell or mask type, the said doll's head comprising a thin shell of a fabric material shaped into face configuration and suitably ornamented, the ornamentation including the eye representations 19, 19. In applying the eye lash members to this mask head, I cut or incise the wall of the head over the eye representations producing a gash or slit 20, thus breaking the wall above the eye representations but without otherwise affecting the structural integrity of the head. The eye lash members are then inserted through the gashes or slits produced, the hair strands 10 projecting outwardly from said slit and the fabric band 11 extending inwardly of the slit, all as clearly shown in Figs. 1 to 3 of the drawings. The eye lash member is then united to the walls of the slit and this is accomplished in such a manner as to reunite the wall portions separated by the slit. More specifically, this is accomplished by applying to the fabric network, shown to the left of Fig. 2, a dab or gob of adhesive 21, as shown to the right of Fig. 2 of the drawings, this adhesive penetrating and saturating the fibre threads 11 and attaching itself interiorly to the surfaces of the walls between the slit or gash 20, some of the adhesive filling the slit, all as clearly shown in Fig. 3 of the drawings. By this means the eye lash member is firmly attached to the doll's head, and the walls of the doll's head separated by the slit are reunited to produce an integral structure, the adhesive in penetrating the fibre network also serving as an aid in securing each of the tufts 12 of hair to the fibre binding loops 13.

In applying or affixing the eye lash members to the doll's head, the hair strands 10 of the eye lash member may be given any desired curvature depending upon the configuration of the slit 20, and may be also given a fan-like spread to produce a radiating formation, as indicated in Fig. 1 of the drawings, this being obtained by gently forcing the fabric band 11 against the interior surface of the slit walls, it being noted that the fabric network is so yieldable and flexible in its own plane as to permit of this being accomplished with ease and facility.

Figure 7:
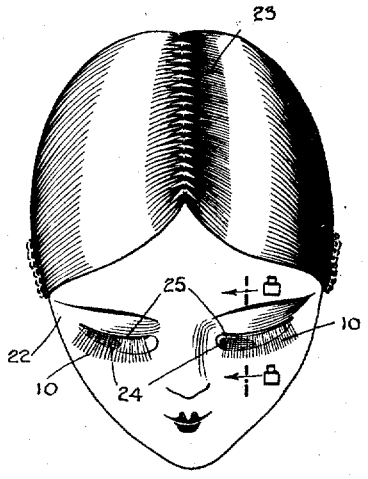
Fig. 7 is a plan view of a modified form of shell-like doll's head showing the eye lash member of the invention applied thereto.
Figure 8:
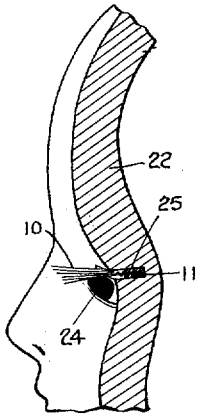
Fig. 8 is a view thereof taken on an enlarged scale and in cross section in the plane of the line 8—8, Fig. 7.

In Figs. 7 and 8 of the drawings, I show a modified combination of head and eye lash member embodying the features of my present invention. This modification, in some of its features, is being claimed in a copending application which is a continuation in part of the present application. In these figures the head 22, having a wig structure 23, which may be produced in the manner described and claimed in my Letters Patent No. 1,628,-591 of May 10, 1927, is also of shell-like form made of a moldable product and providing a wall thickness which is substantially larger than the thin flexible wall of the fabric doll head of Figs. 1 to 3 of the drawings. The doll head 22 is also shaped to facial configuration and provided with the eye representations 24. In applying the invention, the wall of the doll's head is slitted or cut as at 25 above the eye representations 24, the slitting being carried out to a depth less than the thickness of the wall 22 so that a groove or channel is produced, as clearly shown in Fig. 8 of the drawings. The eye lash member is then inserted in the groove, the bottom of the groove being filled with adhesive which may be applied either to the groove walls or to the fabric band. The application of the invention to the form of head shown in these Figs. 7 and 8 illustrates at least two important features or advantages of the eye lash construction. The fan-like support desired is produced as illustrated, the twistability or flexibility of the fabric network in its own plane permitting this to be effectively accomplished. The comparatively small thickness of the doll's head wall 22 accommodates best only narrow bases or foundations, and the narrow network band 14, a characteristic of the eye lash structure of my invention, can suitably be received and accommodated by the small trough, channel or slit 25 provided.

The manner of making and applying eye lash members of my present invention, and the manner of making dolls' heads combined with eye lashes of my invention, and the many advantages in the process and use thereof will, in the main, be fully apparent from the above detailed description thereof. It will also be apparent that while I have shown and described my invention in the preferred forms, many changes and modifications may be made in the structure disclosed without departing from the spirit of the invention, defined in the following claims.

I claim:

1. In combination, a doll's head bearing a representation of an eye thereon, a thin slit cut in the wall of the head over the eye representation thereof, and an eye lash inserted into said slit, said eye lash comprising a fringe layer of hair strands and a supporting foundation therefore, the supporting foundation consisting of a network of fabric strands interwoven with the strands of the hair layer at one end of said layer, said eye lash being held directly between, cemented directly to, and supported directly by the walls of said slit.

2. In combination, a doll's head bearing representations of eyes thereon, thin slits cut in the wall of the head over the eye representations thereof, and eye lashes inserted into said slits, each of said eye lashes comprising a fringe layer of hair strands and a supporting foundation therefor, the supporting foundation consisting of a network of fabric strands interwoven with the strands of the hair layer at one end of said layer, the hair layers being subdivided into tufts, each tuft being held by a binding loop of the fabric strands, and adhesive means securing said eye lash directly between and to the walls of said slit, in order to support the eye lash in a position projecting normally from the doll's head.

3. In combination, a doll's head made of a thin flexible material forming a shell mask and bearing a representation of an eye thereon, a slit cut through the wall of the head over the eye representation thereof, and an eye lash held in and projecting through said slit, said eye lash comprising a fringe layer of hair strands and a supporting foundation therefor, the supporting foundation consisting of a network of fabric strands interwoven with the strands of the hair layer at one end of said layer, and adhesive means securing said foundation to the walls of said slit, said securing means functioning to cement together the walls of said shell mask separated by said slit.

4. In combination, a doll's head made of a thin flexible material forming a shell mask and bearing a representation of an eye thereon, a slit cut through the wall of the head over the eye representation thereof, and an eye lash comprising a fringe layer of strands held in said slit, and adhesive means securing said eye lash to the walls of said slit, said adhesive securing means acting to secure together the walls of said shell head mask separated by said slit.

5. In the manufacture of heads for dolls, the method which includes molding the head to proper configuration, cutting thin slits in the wall of the head near the eye portions thereof, and securing the base of a fringe eye lash in each of the eye lash slits with the strands of said eye lash extending parallel to and being supported by the walls of the slit.

6. In combination, a doll's head bearing representations of eyes thereon, thin eye lash slits cut in the wall of the head immediately adjacent the eye representations threof, and eye lashes held in said slits, each eye lash comprising a fringe layer of strands, and means securing said eye lashes between the walls of said slit with the strands lying parallel to said walls.

7. In combination, a molded doll's head bearing representations of eyes thereon, thin eye lash slits cut in the wall of the head immediately adjacent the eye representations thereof, and eye lashes held in said slits, each eye lash comprising a fringe layer of strands cemented to the walls of said slit with the strands parallel to said walls, and terminating closely thereto at their inner ends.

8. In combination, a molded doll's head bearing representations of eyes thereon, thin eye lash slits cut in the wall of the head immediately adjacent the eye representations thereof, and eye lashes held in said slits, each of said eye lashes comprising a fringe layer of hair strands held between, cemented to, and supported by the walls of said slit.

Signed at New York, in the county of New York, and State of New York, this 28 day of October, 1931.

PERCIVAL HARRIS.